United States Patent
Muller et al.

(10) Patent No.: US 10,958,558 B2
(45) Date of Patent: Mar. 23, 2021

(54) REACTIVE SOURCE ROUTING ASSOCIATED WITH A NETWORK

(71) Applicant: Red Hat Israel, Ltd., Raanana (IL)

(72) Inventors: Assaf Muller, Raanana (IL); Dan Kenigsberg, Dublin (IE)

(73) Assignee: Red Hat Israel, Ltd., Raanana (IL)

( * ) Notice: Subject to any disclaimer, the term of this patent is extended or adjusted under 35 U.S.C. 154(b) by 529 days.

(21) Appl. No.: 14/191,358

(22) Filed: Feb. 26, 2014

(65) Prior Publication Data
US 2015/0244608 A1     Aug. 27, 2015

(51) Int. Cl.
| | |
|---|---|
| *H04L 12/751* | (2013.01) |
| *H04L 29/06* | (2006.01) |
| *H04L 12/715* | (2013.01) |
| *H04L 12/66* | (2006.01) |
| *H04L 12/24* | (2006.01) |
| *H04L 29/12* | (2006.01) |

(52) U.S. Cl.
CPC .............. *H04L 45/02* (2013.01); *H04L 12/66* (2013.01); *H04L 41/08* (2013.01); *H04L 45/04* (2013.01); *H04L 61/2015* (2013.01); *H04L 63/02* (2013.01); *H04L 61/2007* (2013.01)

(58) Field of Classification Search
CPC ......... H04L 45/02; H04L 41/08; H04L 45/04; H04L 12/66; H04L 63/02; H04L 61/2007; H04L 61/2015

USPC .......................................................... 709/220
See application file for complete search history.

(56) References Cited

U.S. PATENT DOCUMENTS

| | | | | |
|---|---|---|---|---|
| 6,751,677 | B1* | 6/2004 | Ilnicki ..................... | H04L 63/08 707/999.103 |
| 7,055,173 | B1* | 5/2006 | Chaganty ............ | H04L 41/0654 726/11 |
| 2005/0240625 | A1* | 10/2005 | Chang ..................... | G06Q 10/08 |
| 2010/0211658 | A1* | 8/2010 | Hoogerwerf ............ | H04L 63/20 709/221 |
| 2012/0173757 | A1* | 7/2012 | Sanden .................. | H04L 45/586 709/238 |
| 2015/0146722 | A1* | 5/2015 | Wainner ................ | H04L 45/742 370/392 |

* cited by examiner

*Primary Examiner* — Emmanuel L Moise
*Assistant Examiner* — Xiang Yu
(74) *Attorney, Agent, or Firm* — Womble Bond Dickinson (US) LLP (57) ABSTRACT

An initiation of a network device on a host system may be detected and an IP address may be assigned to the network device. Furthermore, a network gateway may be associated with the IP address. In some embodiments, a network may be assigned to the network device. The network may be configured to route outgoing data from the network through the network gateway as opposed to a default network gateway.

9 Claims, 5 Drawing Sheets

REACTIVE SOURCE ROUTING ASSOCIATED WITH A NETWORK

TECHNICAL FIELD

Aspects of the disclosure generally relate to network routing and, more specifically, relate to reactive source routing associated with networks.

BACKGROUND

A gateway may be a node (e.g., a router) on a network that serves as an access point between the network and another network. For example, a gateway may be a node on a network that is as an entry point and an exit point for the network. Data may enter the network through the gateway and return data may exit the network through the gateway.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure relate to a routing module to configure a network to route outgoing data from the network through a selected network gateway associated with a data center. In some embodiments, a data center may be considered a virtual entity for physical and logical resources within a virtualization environment. For example, the types of physical resources that may be included in a data center include, but are not limited to, central processing unit (CPU) resources provided by host systems (e.g., servers) and/or clusters of host systems (i.e., multiple host systems organized as a logical group), network resources such as logical networks and physical network interface controllers (NICs), and storage resources. The data center may further run virtual machines on the host systems.

Thus, a data center may include a host system that runs a virtual machine, a network, and a network device (e.g., a NIC). In some embodiments, the host system may include multiple network devices and may be associated with multiple networks. For example, a first network device of the host system may be associated with a first network and a second network device of the host system may be associated with a second network. The host system may further be associated with a network gateway. A network gateway (e.g., a router) may be a node for the data center that serves as an access point to another network (e.g., a network connection to a client system). In some embodiments, the network gateway may be considered an entry point and an exit point for a network.

A host system may utilize a default network gateway that may be assigned to one network. For example, since the host system may include a first network and a second network, data traffic may enter the first network and the second network, but may only exit through the default network gateway that is assigned to the network. For example, the default network gateway may be assigned to the first network. Data traffic that may be sent to either the first network or the second network, but return data traffic from either of the first network and the second network may exit through default network gateway of the first network. However, the first network and the second network may be associated with different firewalls that control the incoming and outgoing network data traffic by analyzing the data packets and determining whether they should be allowed through or not, based on an applied rule set. Thus, return data traffic of data that is sent to the second network may be routed through the default network gateway associated with the first network. However, since the first network and the second network may have different firewall settings, the return data traffic of the second network may be not be successfully transmitted through the default network gateway.

Thus, a separate network gateway may be assigned to the second network. For example, a second network device of the host system may be associated with a second network gateway that is different than the default network gateway. Return data traffic of the second network may then be routed through the second network gateway instead of being routed through the default network gateway. For example, a routing table may be modified to route return data traffic through the second network gateway as opposed to the default network gateway.

Figure 1:
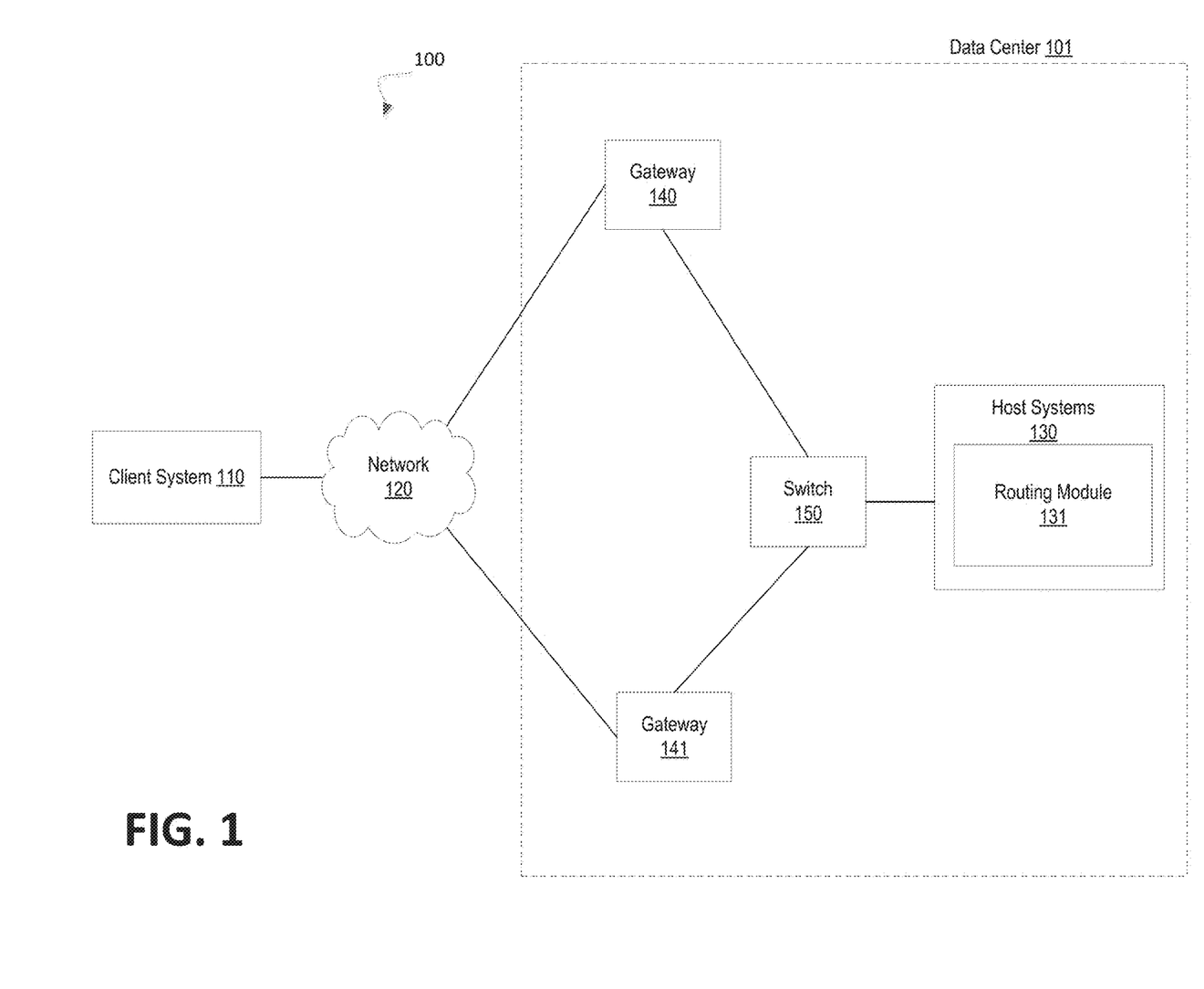
FIG. 1 illustrates an example system architecture in which embodiments of the disclosure may operate.

FIG. 1 is an example system architecture 100 for various implementations of the disclosure. The system architecture 100 may include a client system 110, network 120, and a data center 101. The network 120 may be a public network (e.g., the Internet), a private network (e.g., a local area network (LAN) or a wide area network (WAN)), or a combination thereof. Network 120 may include a wireless infrastructure, which may be provided by one or multiple wireless communications systems, such as a—(WiFi) hotspot connected with the network 120 and/or a wireless carrier system that may be implemented using various data processing equipment, communication towers, etc.

Data center 101 may include multiple components as previously described. For example, the data center 101 may include one or more host systems 130 that may be associated with multiple networks. Furthermore, the data center 101 may include a switch 150, a network gateway 140 (e.g., a default network gateway) and a second network gateway 141. In some embodiments, the switch 150 may be used to connect devices (e.g., the host systems 130 and/or client system 130) over the network 120. The data center 101 may further include a network gateway 140 and a network gateway 141. In some embodiments, the network gateway 140 may be considered a default network gateway for one or more host systems 130. For example, as previously described, the one or more host systems 130 may be associated with a first network and a second network. The first network may be associated with the network gateway 140 and the second network may be associated with the network gateway 141. For example, return data traffic from the first network may be transmitted through the network gateway 140 and return data traffic from the second network may be transmitted through the network gateway 141.

Furthermore, the one or more host systems 130 may be accessed by a user of the client system 110. For example, one or more of the host systems 130 may run a virtual machine and may include multiple network devices and be associated with multiple networks. The one or more host systems 130 may run multiple virtual machines by executing a software layer, often referred to as "hypervisor," above the hardware and below the virtual machines. In certain implementations, hypervisor may be a component of an operating system executed by one or more host systems 130. Alternatively, the hypervisor may be provided by an application running under host operating system, or may run directly on the one or more host systems 130 without an operating system beneath it. The hypervisor may abstract the physical layer of the one or more host systems 130, including processors, memory, and I/O devices, and present this abstraction to virtual machines as virtual devices, including virtual processors, virtual memory, and virtual I/O devices such as virtual network interface controllers (vNICs).

In some embodiments, the one or more host systems 130 may be associated with a virtual machine display network. In some embodiments, the virtual machine display network may provide virtual machine desktop data of a virtual machine that is run by the one or more host systems 130. For example, a user of the client system 110 may transmit data to the one or more host systems 130 to request display data of a virtual machine from the virtual machine display network. In response, the one or more host systems 130 may transmit display data (e.g., return data traffic) to the client system 110. For example, the display data may be transmitted to the client system 110 through the gateway 141 that is assigned to a network device associated with the virtual machine display network.

Figure 2:
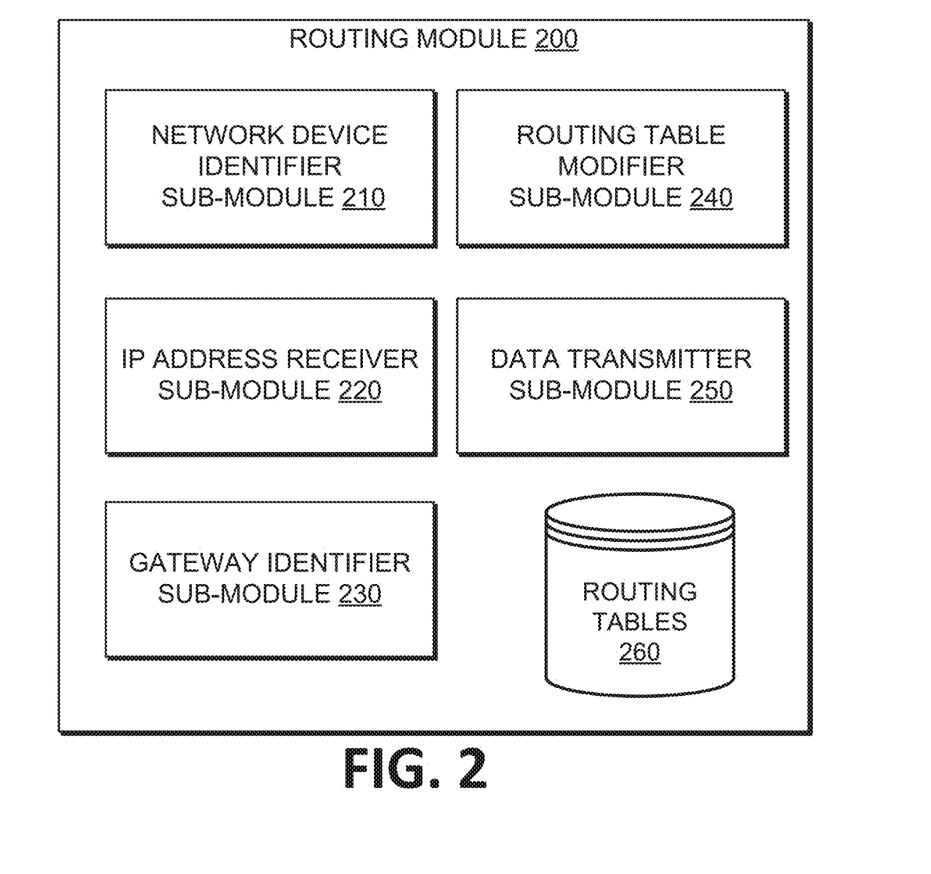
FIG. 2 is a block diagram of an example routing module in accordance with some embodiments of the disclosure.

FIG. 2 is a block diagram of an example routing module 200 in accordance with some embodiments of the disclosure. In general, the script execution module 200 may correspond to the routing module 111 of FIG. 1. The routing module 200 may include a network device identifier sub-module 210, an Internet Protocol (IP) address receiver sub-module 220, a gateway identifier sub-module 230, a routing table modifier sub-module 240, a data transmitter sub-module 250, and routing tables sub-module 260. In alternative embodiments, the functionality of one or more of the sub-modules may be combined or divided.

As shown in FIG. 2, the routing module 200 may include a network device identifier sub-module 210. In some embodiments, the network device identifier sub-module 210 may identify the initiation or start of a network device (e.g., a network interface controller) on a host system (e.g., host system 130). For example, the network device identifier sub-module 210 may identify when a network device has been started and associated with a network (e.g., a virtual machine display network). The routing module 200 may further include an Internet Protocol (IP) address receiver sub-module 220. In some embodiments, the IP address receiver sub-module 220 may receive an IP address associated with a network device that has been identified by the network device identifier sub-module 210. For example, the IP address receiver sub-module 220 may identify an IP address that has been allocated to a network device that has been initiated on a host system.

The routing module 200 may include a gateway identifier 230. In some embodiments, the gateway identifier 230 may identify a network gateway associated with the IP address that has been received by the IP address receiver sub-module 220. For example, the gateway identifier 230 may identify a network gateway that is associated with an IP address that has been allocated to a network device of a host system that has been assigned to a network (e.g., a virtual machine display network).

Returning to FIG. 2, the routing module 200 may include a routing table identifier 240. In some embodiments, the routing table identifier 240 may modify a routing table associated with a network (e.g., the virtual machine display network). A routing table may be a data table that is stored at a host system that lists data routes for a network device of the host system. For example, the routing table may indicate a network gateway to be used by a network device. Thus, a host machine may use the routing table to determine which network gateway (also referred to as a router) to forward a data packet (e.g., the virtual machine display data) from a network assigned to the network device. In some embodiments, a single routing table may be used for multiple networks. In alternative embodiments, a routing table may be used for a single network. Thus, in some embodiments, multiple routing tables may be available where each routing table is for a single network.

The routing module 200 may further include a routing tables storage 260. In some embodiments, the routing tables storage 260 may store routing tables associated with network devices of a host system. For example, the routing tables storage 260 may store a first routing table associated with a first network device and a second routing table associated with a second network device. The first routing table may be associated with a default network gateway of a host system that includes the first network device and the second routing table may be associated with another network gateway of the same host system that includes the second network device. The routing tables storage sub-module 260 may be a persistent storage unit. In some embodiments, a persistent storage unit may be a local storage unit or a remote storage unit. Persistent storage units may be a magnetic storage unit, optical storage unit, solid state storage unit, electronic storage units (main memory), or similar storage unit. Persistent storage units may be a monolithic device or a distributed set of devices. A 'set', as used herein, refers to any positive whole number of items. In some embodiments, the routing tables storage sub-module 260 may store and/or identify supplemental attributes associated with a user. The supplemental attributes may be stored within another identity service that also provides a primary authentication or a secondary authentication or may not provide any authentication.

Figure 3:
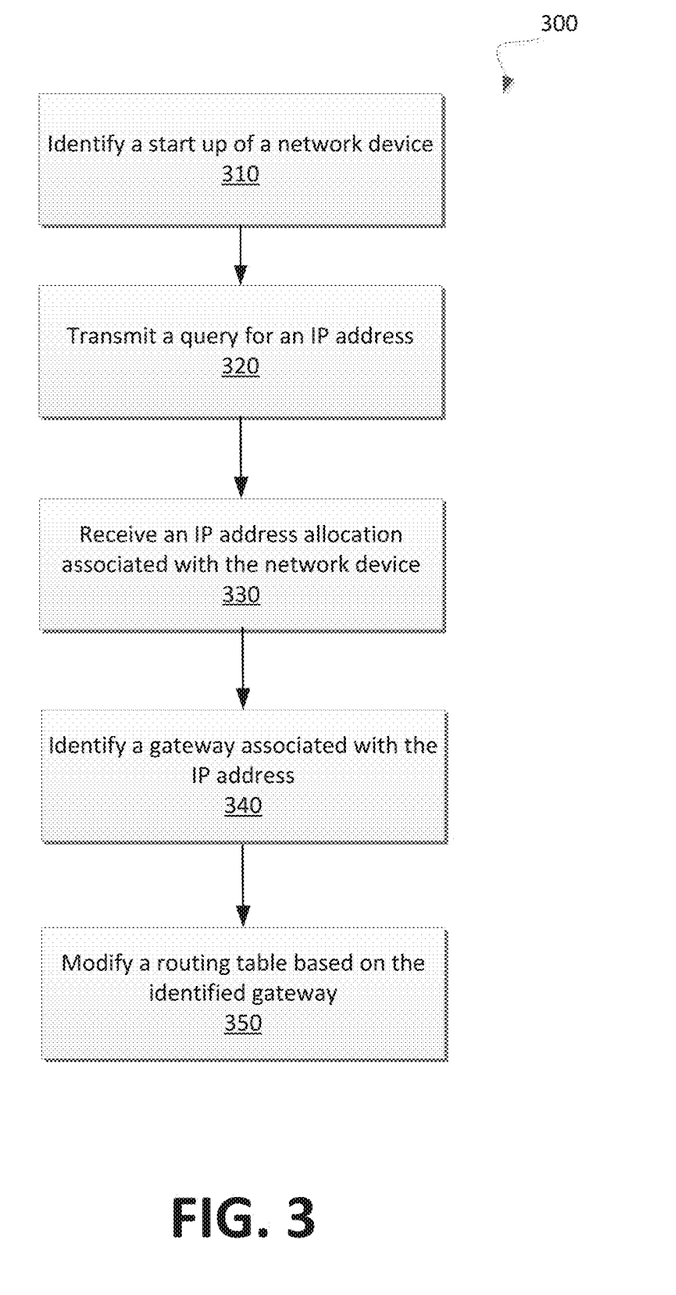
FIG. 3 is an illustrated example method to modify a routing table associated with a network in accordance with some embodiments.

FIG. 3 illustrates an example method 300 to modify a routing table associated with a network in accordance with some embodiments. The method 300 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 300 may be performed by the routing module 200 of FIG. 2.

As shown in FIG. 3, the method 300 may begin with the processing logic identifying a start-up of a network device (block 310). For example, the processing logic may identify that a network device has been initiated on a host system and has been associated with a network. In some embodiments, the network device may be a network interface controller (NIC) of a host system that is currently running a virtual machine that is associated with a virtual machine display network. Furthermore, the network device that is associated with virtual machine display network may be one of multiple network devices of the host system. Furthermore, the processing logic may transmit a query for an IP address (block 320). For example, the processing logic may transmit a query for a static IP address or a dynamic IP address. In some embodiments, if the query is for a dynamic IP address, then the query may be transmitted based on a Dynamic Host Configuration Protocol (DHCP).

As an example, the query for an IP address may first transmit a configuration command via the NIC of the host system. In response to the query, the response may include a static IP address or may include an identifier specifying DHCP. If the query includes a static IP address then the static IP address may be used to configure and assign the received static IP address to the NIC. However, if the response includes an identifier specifying DHCP, then the host system may configure the network device to be in a state (e.g., an 'on' state) and the NIC (i.e., the network device) may transmit a DHCP request to request a dynamic IP address from a DHCP server.

Returning to FIG. 3, the processing logic may receive an IP address allocation associated with the network device (block 330). In some embodiments, the IP address allocation may be received in response to the query for the IP address of the network device that has been identified as starting up on the host system. The IP address may either be a static IP address or a dynamic IP address. For example, if the IP address is a dynamic IP address, the processing logic may renew the IP address or acquire a new IP address at particular time intervals. Furthermore, the processing logic may identify a network gateway associated with the IP address (block 340). For example, the processing logic may identify a network gateway that is different than a default network gateway of a host system. In some embodiments, a network gateway may be a node (or a router) on a TCP/IP network that serves as an access point of a network. For example, the network gateway may be an entry point and an exit point of a virtual machine display network that is associated with a network device that has been allocated the IP address. Furthermore, the identified network gateway may be different than a default network gateway that is currently assigned to the host system.

The processing logic may modify a routing table based on the identified gateway (block 350). For example, the processing logic may modify a routing table of a network that is associated with a network device that has been allocated the IP address. In some embodiments, the modification of the routing table may include the allocated IP address for the network device and identification information of the network gateway for the network.

As such, an initiation of a network device of a host system may be detected. Furthermore, the network device may be one of multiple network devices of the host system. An IP address of the initiated network device may be identified. Additionally, a network gateway associated with the IP address may be identified. In some embodiments, the network gateway may be different than the default network gateway of the host system. In the same or alternative embodiments, the IP address assigned to the network device may be a dynamic IP address. In such a case, an IP address may be assigned to the network device after a predetermined time interval. Thus, the IP address may be renewed or a new one may be acquired. Furthermore, the routing table for the network associated with the network device may be updated to reflect the new IP address if a new IP address is assigned to the network device.

Figure 4:
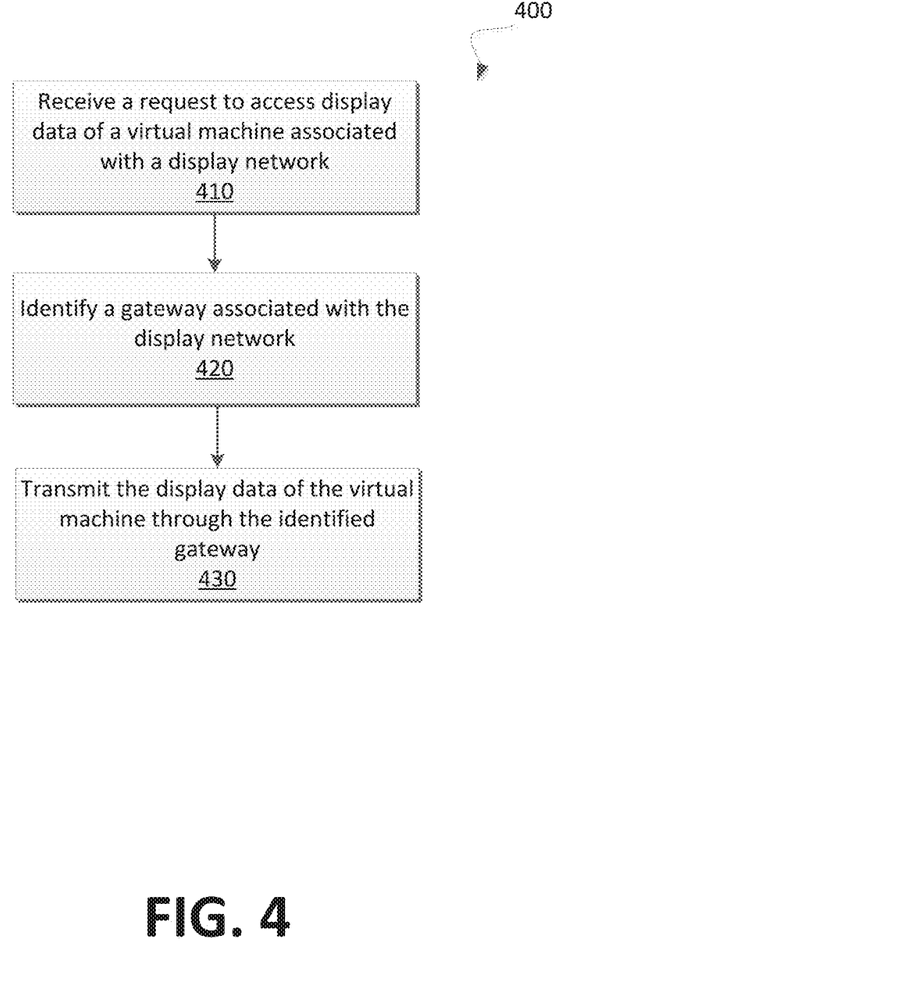
FIG. 4 is an illustrated example method to transmit data through a network gateway associated with a network in accordance with some embodiments.

FIG. 4 is an illustrated example method 400 to transmit data through a network gateway associated with a network in accordance with some embodiments. The method 400 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 400 may be performed by the routing module 200 of FIG. 2.

As shown in FIG. 4, the method 400 may begin with the processing logic receiving a request to access display data of a virtual machine associated with a virtual machine display network (block 410). In some embodiments, the virtual machine display network may be assigned to a network device of a host system that runs a virtual machine. Furthermore, the processing logic may identify a network gateway associated with the virtual machine display network (block 420). For example, the processing logic may identify a network gateway that is assigned to the IP address for a network device that is associated with a network of the host system. The processing logic may transmit the display data of the virtual machine through the identified network gateway (block 430). For example, the processing logic may transmit display data of the virtual machine display network to a remote client system through the identified network gateway that is assigned to the network device.

Figure 5:
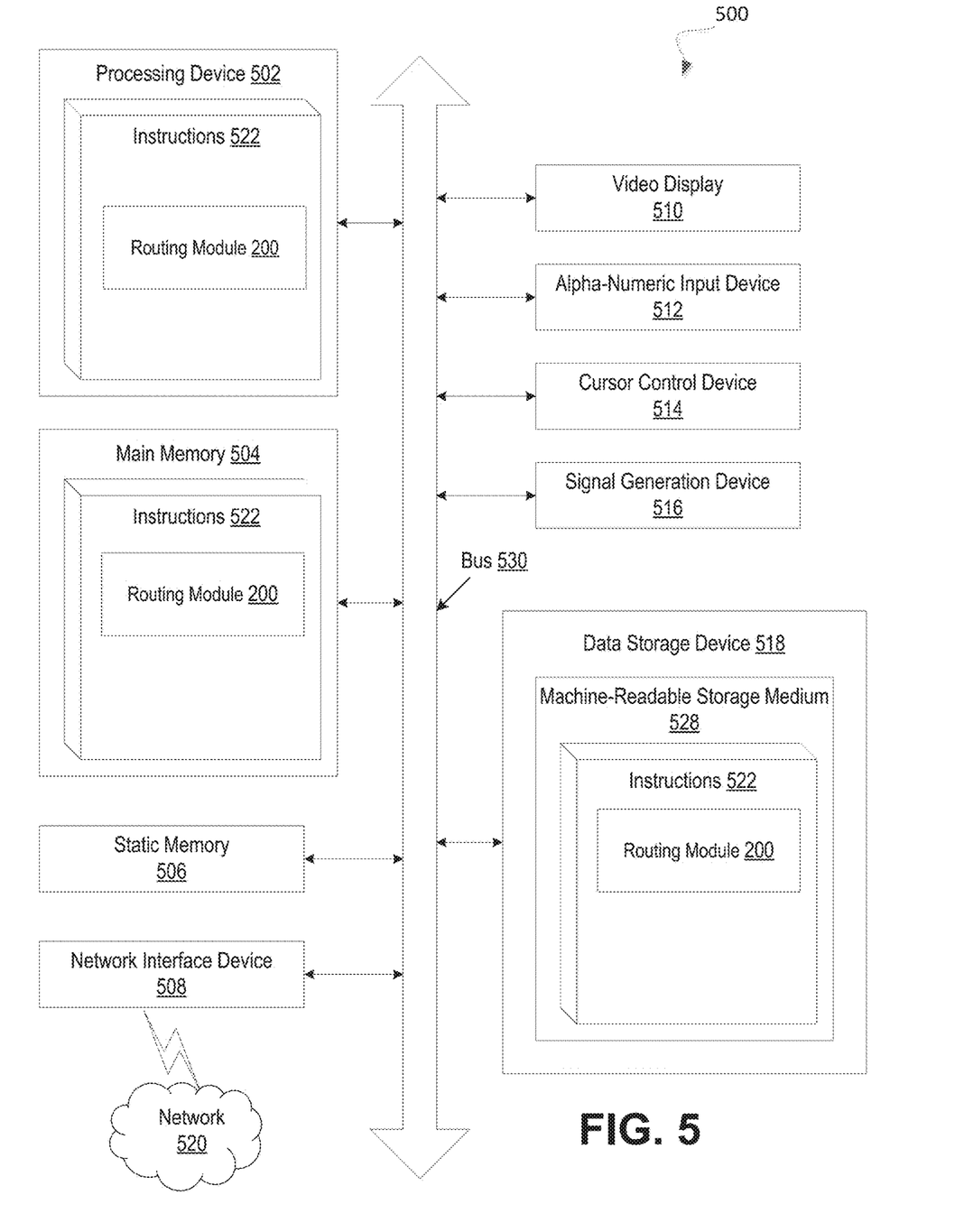
FIG. 5 illustrates a block diagram of an embodiment of a computer system in which some embodiments of the disclosure may operate.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 (also known as a computer-readable medium) on which is stored one or more sets of instructions or software 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one implementation, the instructions 522 include instructions for a row module (e.g., routing module 131 of FIG. 1 and/or routing module 200 of FIG. 2) and/or a software library containing methods that call modules or sub-modules in a routing module. While the machine-readable storage medium 528 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
    identifying an initiation of a network device of a host system associated with a network, wherein the network device is a network interface controller (NIC) of a host system that is currently running a virtual machine that is associated with a virtual machine display network;
    transmitting a query for a static Internet Protocol (IP) address or a dynamic IP address for the IP address of the network device;
    determining whether to assign the static IP address or the dynamic IP address to the IP address of the network device, wherein assigning the dynamic IP request is determined in view of whether a response includes an identifier specifying a Dynamic Host Configuration Protocol (DHCP);

receiving the IP address, being either the assigned static IP address or the assigned dynamic IP address, associated with the network device;

identifying a network gateway, from a plurality of network gateways of the network that are used by the host system, that is associated with the IP address;

configuring, by a processing device, the network to route outgoing data, comprising display data of the virtual machine, from the network device of the host system via the network through the identified network gateway by using the IP address of the network device, wherein:

the identified network gateway is different from, and has a different firewall setting than, a default network gateway of the plurality of network gateways, the default network gateway being used to route incoming data via the network to the network device of the host system, and wherein the identified network gateway to route the outgoing data from the network device is associated with a different firewall setting than the default network gateway used to route the incoming data to the network device, wherein configuring the network to route the outgoing data through the identified network gateway comprises:

updating a routing table of the host system associated with the network to comprise the IP address of the network device and the identified network gateway;

receiving a new IP address to be assigned to the network device;

updating the routing table associated with the network to comprise the new IP address; and updating the routing table to reroute return data traffic through the identified network gateway.

2. The method of claim 1, wherein the updating of the routing table comprises replacing the IP address with the new IP address.

3. The method of claim 1, further comprising:

receiving a request for data associated with a display of the virtual machine; and transmitting the data associated with the display of the virtual machine from the network through the identified network gateway.

4. A host system, comprising:

a routing table; and a processing device, operatively coupled with the routing table, to:

identify an initiation of a network device of the host system associated with a network, wherein the network device is a network interface controller (NIC) of a host system that is currently running a virtual machine that is associated with a virtual machine display network;

transmit a query for a static Internet Protocol (IP) address or a dynamic IP address for the IP address of the network device;

determine whether to assign the static IP address or the dynamic IP address to the IP address, wherein assigning the dynamic IP request is determined in view of whether a response includes an identifier specifying a Dynamic Host Configuration Protocol (DHCP);

receive the IP address, being either the assigned static IP address or the dynamic IP address, associated with the network device;

identify a network gateway, from a plurality of network gateways of the network that are used by the host system, that is associated with the IP address;

configure the network to route outgoing data, comprising display data of the virtual machine, from the network device of the host system via the network through the identified network gateway by using the IP address of the network device, wherein:

the identified network gateway is different from, and has a different firewall setting than, a default network gateway of the plurality of network gateways, the default network gateway being used to route incoming data via the network to the network device of the host system, wherein to configure the network to route the outgoing data through the identified network gateway, the processing device to:

update the routing table associated with the network to comprise the IP address of the network device and the identified network gateway;

receive a new IP address to be assigned to the network device;

update the routing table associated with the network to comprise the new IP address: and update the routing table to route return data traffic through the identified network.

5. The system of claim 4, wherein the processing device is further to:

receive a request for data associated with a display of the virtual machine; and transmit the data associated with the display of the virtual machine from the network through the identified network gateway.

6. The system of claim 4, wherein to update the routing table the processing device is further to replace the IP address with the new IP address.

7. A non-transitory machine-readable storage medium comprising data that, when accessed by a processing device of a host system, cause the processing device to:

identify an initiation of a network device of the host system associated with a network, wherein the network device is a network interface controller (NIC) of a host system that is currently running a virtual machine that is associated with a virtual machine display network;

transmit a query for a static Internet Protocol (IP) address or a dynamic IP address for the IP address of the network device;

determine whether to assign the static IP address or the dynamic IP address to the IP address, wherein assigning the dynamic IP request is determined in view of whether a response includes an identifier specifying a Dynamic Host Configuration Protocol (DHCP);

receive the IP address, being either the assigned static IP address or the dynamic IP address, associated with the network device;

identify a network gateway, from a plurality of network gateways of the network that are used by the host system, that is associated with the IP address;

configure the network to route outgoing data, comprising display data of the virtual machine, from the network device of the host system via the network through the identified network gateway by using the IP address of the network device, wherein:

the identified network gateway is different from, and has a different firewall setting than, a default network gateway of the plurality of network gateways, the default network gateway being used to route incoming data via the network to the network device of the host system, wherein to configure the network to route the outgoing data through the identified network gateway, the processing device to:

update a routing table associated with the network to comprise the IP address of the network device and the identified network gateway;

receive a new IP address to be assigned to the network device;

update the routing table associated with the network to comprise the new IP address; and update the routing table to route return data traffic through the identified network gateway.

8. The non-transitory machine-readable storage medium of claim 7, wherein to update the routing table the processing device is further to replace the IP address with the new IP address.

9. The non-transitory machine-readable storage medium of claim 7, wherein the processing device is further to:

receive a request for data associated with a display of the virtual machine; and transmit the data associated with the display of the virtual machine from the network through the identified network gateway.

\* \* \* \* \*